(12) United States Patent
Liaw et al.

(10) Patent No.: US 12,034,201 B2
(45) Date of Patent: Jul. 9, 2024

(54) CHIP PACKAGING STRUCTURE

(71) Applicant: SES RFID SOLUTIONS GmbH, Dusseldorf (DE)

(72) Inventors: Shao-Lun Liaw, Taichung (TW); Yu-Cheng Li, Taichung (TW)

(73) Assignee: SES RFID SOLUTIONS GmbH, Dusseldorf (DE)

( * ) Notice: Subject to any disclaimer, the term of this patent is extended or adjusted under 35 U.S.C. 154(b) by 21 days.

(21) Appl. No.: 17/870,016

(22) Filed: Jul. 21, 2022

(65) Prior Publication Data

US 2023/0082794 A1 Mar. 16, 2023

Related U.S. Application Data

(60) Provisional application No. 63/245,090, filed on Sep. 16, 2021.

(30) Foreign Application Priority Data

Jun. 21, 2022 (TW) .................................. 111123125

(51) Int. Cl.
*H01Q 1/22* (2006.01)
*H01Q 1/36* (2006.01)

(52) U.S. Cl.
CPC ............. *H01Q 1/2283* (2013.01); *H01Q 1/36* (2013.01)

(58) Field of Classification Search
CPC ........... H01Q 1/22; H01Q 1/36; G06K 19/077
See application file for complete search history.

(56) References Cited

U.S. PATENT DOCUMENTS

| | | | | |
|---|---|---|---|---|
| 2007/0170565 | A1* | 7/2007 | Hong | H03H 9/587 257/678 |
| 2009/0065953 | A1* | 3/2009 | Chen | H01L 23/24 438/118 |
| 2017/0111078 | A1* | 4/2017 | Onodera | H04B 1/525 |
| 2019/0181085 | A1* | 6/2019 | Chen | H01L 21/568 |
| 2019/0181536 | A1* | 6/2019 | Chen | H01L 23/49822 |
| 2019/0326232 | A1* | 10/2019 | Lin | H01Q 1/2283 |
| 2022/0085821 | A1* | 3/2022 | Gao | H03L 7/23 |
| 2022/0182771 | A1* | 6/2022 | Fang | G01H 9/004 |
| 2022/0319977 | A1* | 10/2022 | Fan | H01L 21/02 |

* cited by examiner

*Primary Examiner* — Thien M Le
(74) *Attorney, Agent, or Firm* — Apex Juris, pllc; R. Lynette Wylie

(57) ABSTRACT

A chip packaging structure includes a chip module and a main body, wherein the main body has a first portion, a second portion, and a holding portion. The second portion protrudes from the first portion, and a size of the second portion is less than a size of the first portion. The holding portion is located at the second portion, and the chip module is placed at the holding portion to be engaged with the main body.

15 Claims, 5 Drawing Sheets

CHIP PACKAGING STRUCTURE

BACKGROUND OF THE DISCLOSURE

1. Field of the Disclosure

The present invention relates generally to packaging chips, and more particularly to a chip packaging structure, referring to a new type of identification tag for a tire, wherein the structure of the identification tag uses a thermoplastic package to couple a chip and an antenna. Said thermoplastic package tends to be merged with rubber during the tire vulcanization process, which would form no sharp shape to damage the tire.

2. Description of the Prior Art

The radio frequency identification (RFID) technology is widely used in the automotive industry. Instead of using wired sensors, a common implementation in the industry is to implant RF tags in tires. In addition, RF tags can be also used in tracking other automobile parts. Simply by installing RF tag readers at specific locations such as toll booths or checkpoints, the usage and operating condition of relevant parts can be easily tracked. However, automobiles usually operate in an environment of high temperature and high pressure, and therefore the RF tags implanted inside tires or other automobile parts require utmost durability, which is an ongoing goal of improvement for the industry.

SUMMARY OF THE DISCLOSURE

In view of the situation mentioned above, the present invention provides a chip packaging structure capable of enhancing the durability of a packaged chip, and therefore would be more suitable for the automotive industry.

The present invention provides a chip packaging structure, which includes a chip module and a main body. The main body includes a first portion, a second portion, and a holding portion, wherein the second portion protrudes from the first portion, and a size of the second portion is smaller than a size of the first portion; the holding portion is located at the second portion. The chip module is placed at the holding portion to be engaged with the main body.

In an embodiment, the holding portion of the main body is located at a side of the second portion away from the first portion, and the chip module is placed on the holding portion.

In an embodiment, the chip packaging structure further includes a linear antenna, wherein the linear antenna includes a first extending portion, a second extending portion, and a winding portion; the first extending portion is connected to the winding portion, the second extending portion is connected to the winding portion, and the winding portion winds around the chip module.

In an embodiment, the chip packaging structure further includes an adhesive member adapted to bond the winding portion of the linear antenna to the chip module, wherein the adhesive member covers at least a part of at least a side of the chip module.

In an embodiment, the main body further includes a third portion, wherein the third portion is connected to the second portion, and is located at a side opposite to the first portion; a size of the third portion is greater than the size of the second portion; the holding portion of the main body is located in the second portion; each of the first portion and the third portion has a through hole communicating with the holding portion; the chip module is placed in the holding portion.

In an embodiment, the main body includes a first shell and a second shell; the first shell and the second shell are correspondingly engaged to form the first portion, the second portion, the third portion, and the holding portion inside the holding portion.

In an embodiment, the chip packaging structure further includes a linear antenna, wherein the linear antenna includes a first extending portion, a second extending portion, and a winding portion; the first extending portion is connected to the winding portion, the second extending portion is connected to the winding portion, and the winding portion winds around the second portion of the main body.

In an embodiment, the chip packaging structure further includes an adhesive member adapted to bond the winding portion of the linear antenna to the main body, wherein the adhesive member covers at least a part of a side of the main body.

In an embodiment, an end of the first extending portion and an end of the second extending portion which are away from the winding portion of the linear antenna are adjacent to each other.

In an embodiment, the winding portion of the linear antenna is substantially rectangular or round.

In an embodiment, an appearance of the first portion and an appearance of the third portion of the main body are rectangular or round.

In an embodiment, the through hole of the first portion, the holding portion located inside the second portion, and the through hole of the third portion all have a cross-sectional shape of a rectangle or a circle.

In an embodiment, the first portion, the second portion, and the third portion together form a slot adapted to accommodate the winding portion of the linear antenna; the slot has a cross-sectional shape of a semicircular arc, a rectangle, or a polygon.

In an embodiment, the main body is made of a thermoplastic flexible member.

In an embodiment, the thermoplastic flexible member is selected from flexible plastics of Shore A or D hardness.

With the design above, the chip packaging structure provided in the present invention has better durability, can be applied in an environment of high temperature and high pressure, and is not easily damaged.

BRIEF DESCRIPTION OF THE DRAWINGS

The present invention will be best understood by referring to the following detailed description of one illustrative embodiment in conjunction with the accompanying drawings, in which.

DETAILED DESCRIPTION

Figure 1:
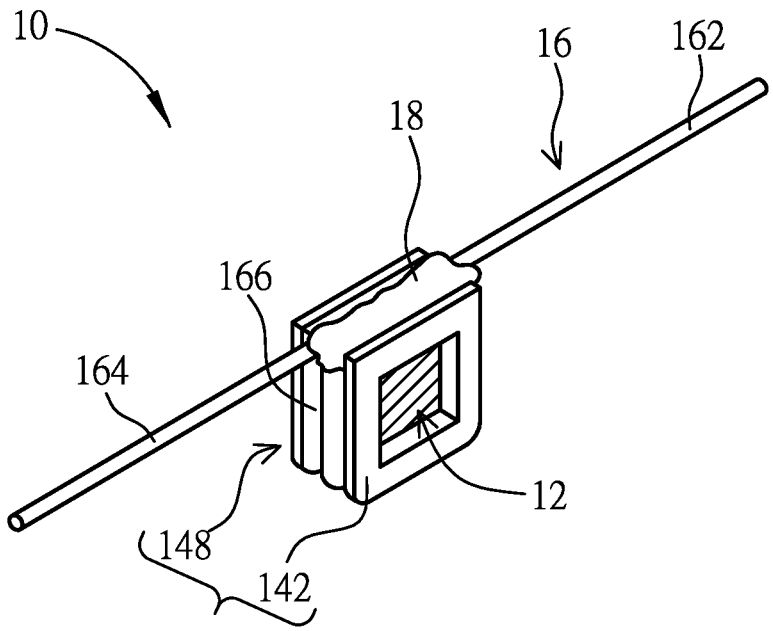
FIG. 1 is a perspective view of the chip packaging structure of a first embodiment of the present invention.
Figure 2:
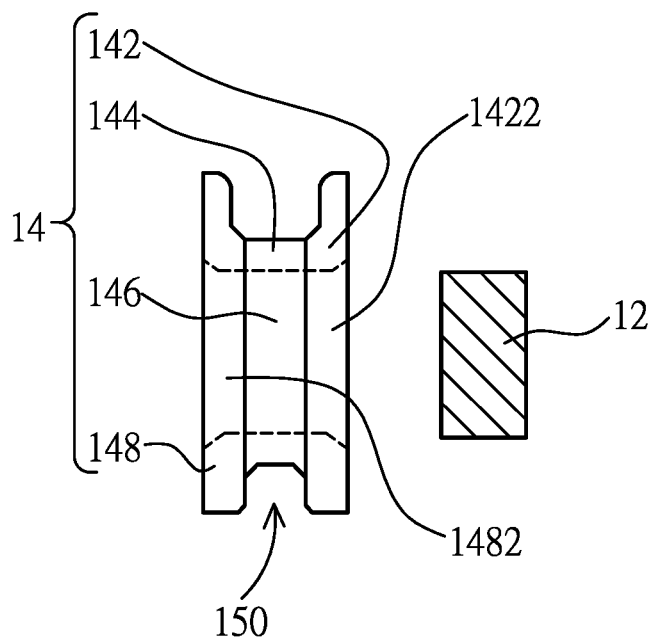
FIG. 2 is an exploded view of the chip packaging structure of the first embodiment of the present invention, showing how the chip module and the main body are engaged, wherein the linear antenna is omitted.

A chip packaging structure 10 of a first embodiment of the present invention is shown in FIG. 1 and FIG. 2, which includes a chip module 12, a main body 14, a linear antenna 16, and an adhesive member 18. It should be noted that, the chip module 12 usually includes a miniature antenna and a radio frequency identification chip connected to each other; however, since the interior structure of the chip module 12 is not the key feature of the present invention, the miniature antenna and the radio frequency identification chip are not illustrated in any drawings of the present invention and are not limitations of the present invention. Basically, any chip modules that meet the general understating in this industry should be deemed equivalent to the chip module 12 described in the present invention. This principle also applies in other embodiments.

As shown in FIG. 1 and FIG. 2, the main body 14 of the chip packaging structure 10 includes a first portion 142, a second portion 144, a third portion 148, and a holding portion 146. The second portion 144 protrudes from the first portion 142. A size of the second portion 144 is smaller than a size of the first portion 142. The third portion 148 is connected to the second portion 144, and is located on a side opposite to the first portion 142. Furthermore, a size of the third portion 148 is also greater than the size of the second portion 144. In the current embodiment, the holding portion 146 of the main body 14 is in the second portion 144. The first portion 142 has a through hole 1422, while the third portion also has a through hole 1482. These through holes 1422, 1482 respectively communicate with the holding portion 146. The chip module 12 is engaged with the main body 14 by placing at the holding portion 146. More specifically, the chip module 12 is placed in the holding portion 146 through the through hole 1422 or the through hole 1482, whereby to be engaged in the main body 14.

The linear antenna 16 includes a first extending portion 162, a second extending portion 164, and a winding portion 166. The first extending portion 162 is connected to the winding portion 166, the second extending portion 164 is connected to the winding portion 166, and the winding portion 166 winds around the main body 14. Since the size of the second portion 144 of the main body 14 is smaller than those of the first portion 142 and the third portion 148, the main body 14 has a slot 150 formed on an outer surface thereof, wherein the slot 150 could accommodate the winding portion 166 of the linear antenna 16. With this design, the winding portion 166 could wind along the slot 150. It should be clarified that, the way the winding portion 166 winds around the main body 14 shown in the drawings is merely an example, and so are the shapes of the extending portions 162, 164. These examples are not limitations of the present invention. In other words, in other embodiments, the shapes of the extending portions 162, 164 could be irregular, and there is no specific limit on the number of winding turns of the winding portion 166. In addition, the slot 150 could be designed to have a cross-sectional shape of a semicircular arc, a rectangle, or a polygon as required.

The adhesive member 18 is used to bond the winding portion 166 of the linear antenna 16 and the main body 14 together, whereby to ensure that the linear antenna 16 and the main body 14 are firmly engaged. To provide a basic bonding function, the adhesive member 18 should cover at least a part of at least a surface of the main body 14. However, in other embodiments, if the winding portion 166 of the linear antenna 16 could firmly wind around the main body 14 on its own, without the risk of falling off, the adhesive member 18 surely could be omitted.

Figure 3:
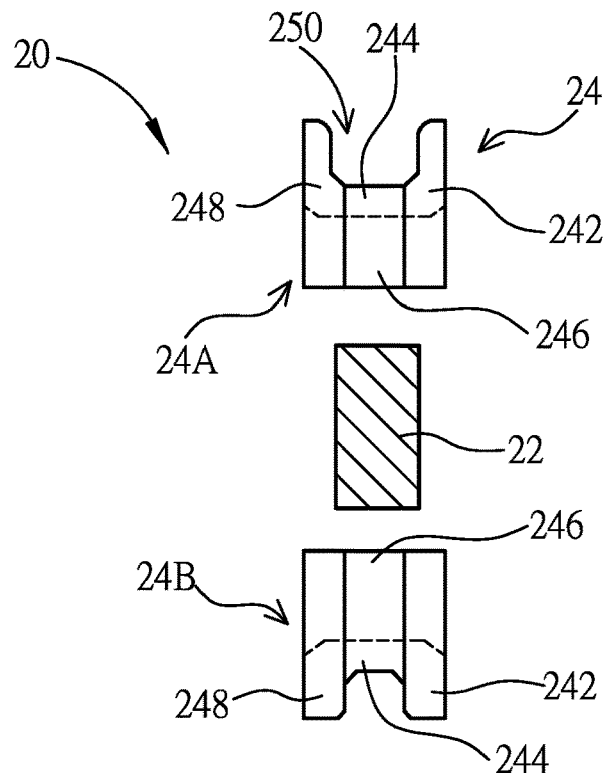
FIG. 3 is an exploded view of the chip packaging structure of a second embodiment of the present invention, showing another way of engaging the chip module and the main body, wherein the linear antenna is omitted, too.

Referring to FIG. 3 illustrates a chip packaging structure 20 of a second embodiment of the present invention. As with the first embodiment, the chip packaging structure 20 also includes a chip module 22 and a main body 24 (the linear antenna and the adhesive member are omitted in this drawing). The main body 24 also includes a first portion 242, a second portion 244, a holding portion 246, and a third portion 248. A size of the first portion 242 and a size of a third portion 248 are both greater than a size of the second portion 244, so that the main body 24 has a slot 250 formed on an outer surface thereof. The slot 250 allows the winding portion of the linear antenna (not shown) to wind thereabout. In addition, the holding portion 246 is also located in the second portion 244 to accommodate the chip module 22. The current embodiment is different from the previous embodiment in that the main body 24 further includes a first shell 24A and a second shell 24B. The first shell 24A and the second shell 24B are correspondingly engaged with each other to form the abovementioned first portion 242, second portion 244, third portion 248, and holding portion 246 inside the second portion 244. Through this corresponding engagement, the chip module 22 no longer needs to go through the through holes on the first portion 242 or the third portion 248 to be placed inside the holding portion 246. In other words, in the current embodiment, the chip module 22 and the main body 24 could be engaged together whether the first portion 242 and the third portion 248 are provided with through holes or not.

Figure 4:
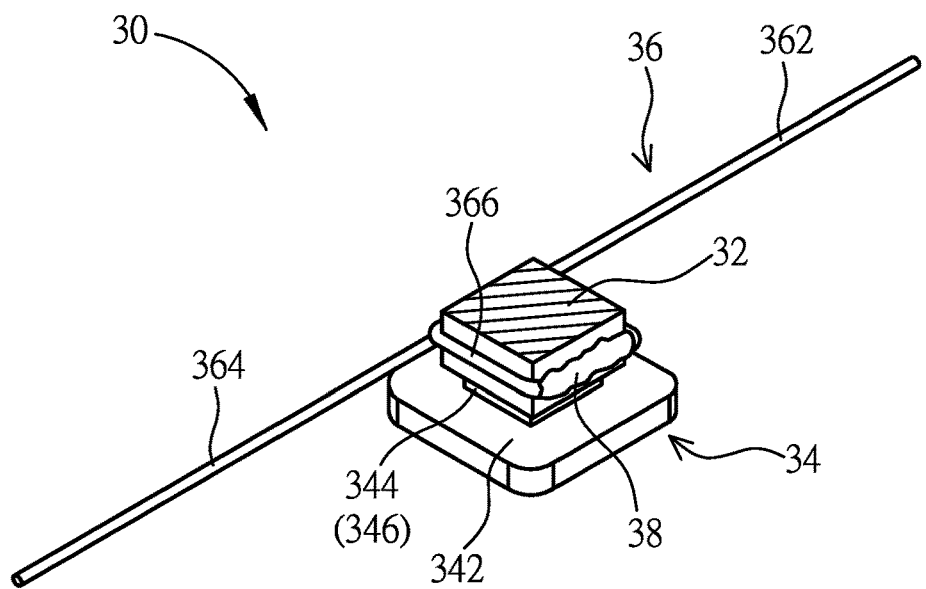
FIG. 4 is a perspective view of the chip packaging structure of a third embodiment of the present invention.
Figure 5:
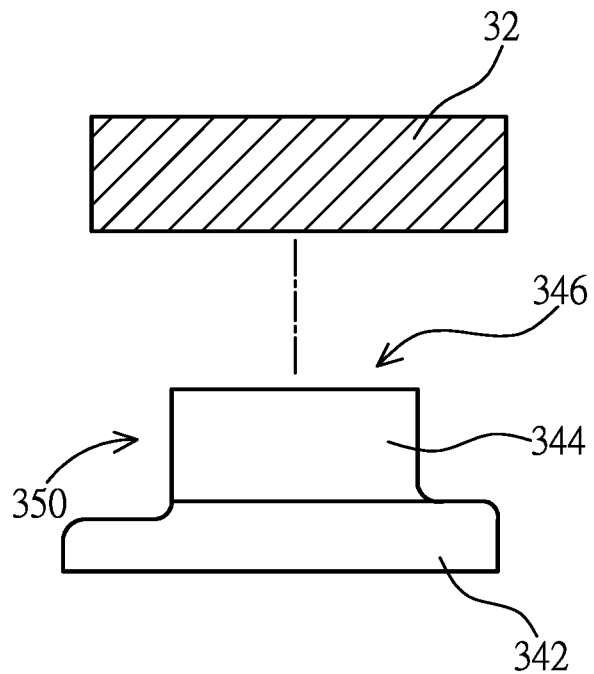
FIG. 5 is an exploded view of the chip packaging structure of the third embodiment of the present invention, showing how the chip module and the main body are engaged, wherein the linear antenna is also omitted.

Now referring to FIG. 4 and FIG. 5, a chip packaging structure 30 of a third embodiment of the present invention is illustrated. As with the previous two embodiments, the chip packaging structure 30 includes a chip module 32, a main body 34, a linear antenna 36, and an adhesive member 38, wherein the main body 34 also includes a first portion 342, a second portion 344, and a holding portion 346. The second portion 344 of the main body 34 protrudes from the first portion 342, and a size of the first portion 342 is greater than a size of the second portion 344. The current embodiment is different from the previous embodiments in that the main body 34 does not have a third portion. Therefore, the size relation of the first portion 342 and the second portion 344 makes the main body 34 have a slot 350 formed on an outer surface thereof, wherein the slot 350 only has one slot wall.

In the current embodiment, the holding portion 346 is not in the second portion 344, but is on a side of the second portion 344 away from the first portion 342. The chip module 32 is engaged with the main body 34 by being placed on the holding portion 346. The linear antenna 36 includes a first extending portion 362, a second extending portion 364, and a winding portion 366. The first extending portion 362 is connected to the winding portion 366, the second extending portion 364 is connected to the winding portion 366, and the winding portion 366 winds around the chip module 32 placed on the holding portion 346. The adhesive member 38 covers at least a part of at least a surface of the chip module 32. Whereby, the winding portion 366 of the linear antenna 36 and the chip module 32 are bound together. It has to be clarified that the shapes of the extending portions 362, 364 are not limited to what is shown in the drawings. The number of winding turns of the winding portion 366 is not a limitation of the present invention, either. In addition, in other embodiments, the winding portion 366 of the linear antenna 36 could, as described in the previous embodiments, wind around the main body 34 along the slot 350 formed on the outer surface of the main body 34, and is not limited to the implementation described here.

Figure 6:
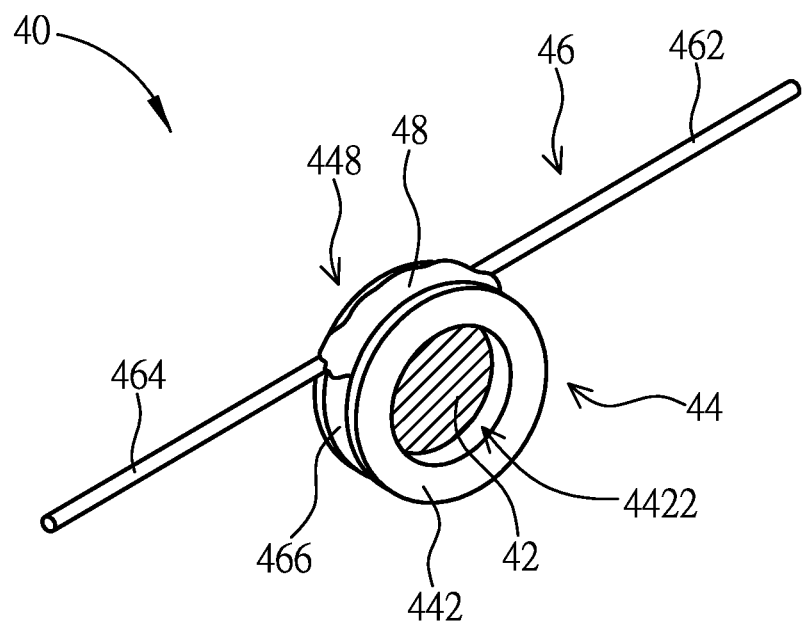
FIG. 6 is an exploded view of the chip packaging structure of a fourth embodiment of the present invention.
Figure 7:
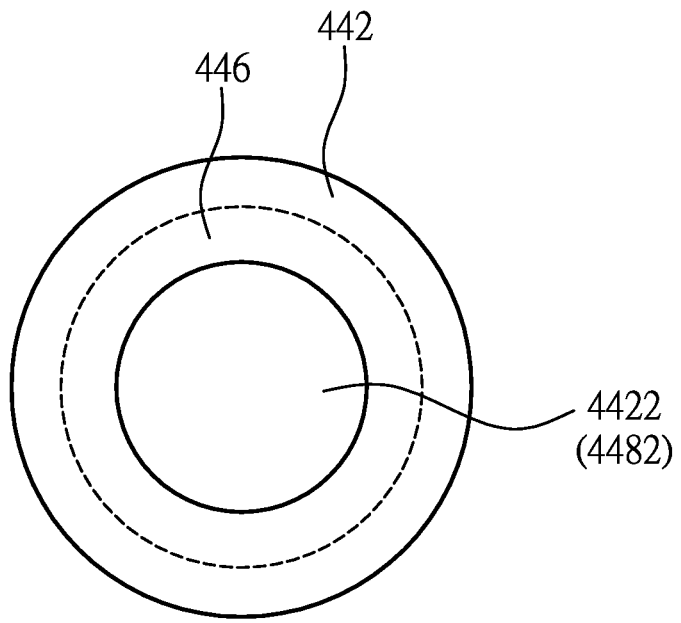
FIG. 7 is a top view of the chip packaging structure of the fourth embodiment, wherein the chip module and the linear antenna are both omitted.

FIG. 6 and FIG. 7 show a chip packaging structure 40 of a fourth embodiment of the present invention. The structure thereof is basically the same as that of the first embodiment, which means that the chip packaging structure 40 also includes a chip module 42, a main body 44, a linear antenna 46, and an adhesive member 48. However, an appearance of the main body 44 is round, which is different from the rectangular design seen in the first embodiment. More specifically, the round main body 44 also includes a first portion 442, a second portion 446, a third portion 448, and a holding portion, wherein the second portion 446 protrudes from the first portion 442, and the third portion 448 is connected to the second portion 446 on a side opposite to the first portion 442. A size of the second portion 446 is smaller than sizes of the first portion 442 and the third portion 448, so that the main body 42 has a circular slot formed on an outer surface thereof. The linear antenna 46 includes a first extending portion 462, a second extending portion 464, and a winding portion 466, wherein the first extending portion 462 and the second extending portion 464 are respectively connected to opposite sides of the winding portion 466. The winding portion 466 winds around the main body 44 along the circular slot on the outer surface of the main body 42. The adhesive member 48 is also adapted to bond the winding portion 466 of the linear antenna 46 and the main body 42, and at least covers a part of the outer surface of the main body 42.

Figure 8:
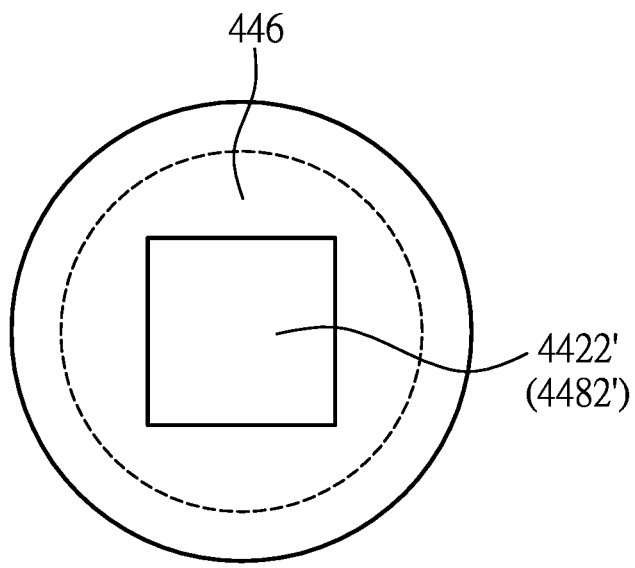
FIG. 8 is a top view of another implementation of the chip packaging structure of the fourth embodiment of the present invention, where in the chip module and the linear antenna are omitted as well.

It should be noted that the winding portion 466 of the wire antenna 46 is substantially wound into a circle, in line with the appearance of the main body 42. However, in other embodiments (like in the previous embodiments), the winding portion 466 of the linear antenna 46 could be substantially wound in a rectangle. In the current embodiment, a through hole 4422 provided on the first portion 442 of the main body 44, the holding portion inside the second portion 446, and a through hole 4482 provided on the third portion 448 all have a round cross-sectional shape. However, this is not a limitation of the present invention. Please refer to FIG. 8, which illustrates another implementation of the current embodiment. A through hole 4422' provided on the first portion 442 of the main body 44, the holding portion inside the second portion 446, and another through hole 4482' provided on the third portion 448 all have a cross-sectional shape of a rectangle. While comparing with the embodiments mentioned above (for example, the first embodiment), it should be understood that the first portion 142, 442 and the third portion 148, 448 of the main body 14, 44 of the chip packaging structure of the present invention can have a shape different from the shapes described herein. In addition to a circle or a rectangle, other shapes not shown in the drawings of the present invention should not be excluded, either.

Figure 9:
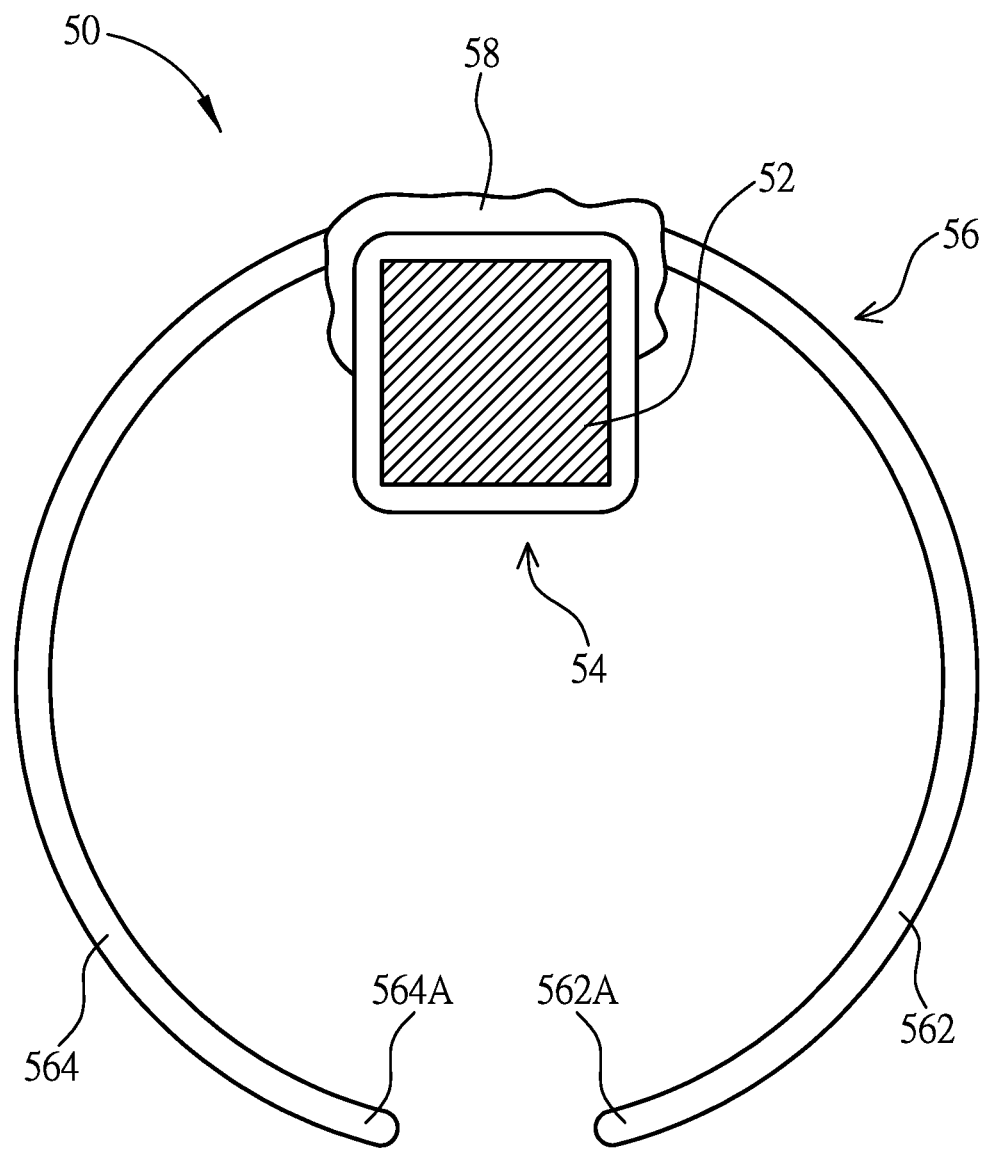
FIG. 9 is a top view of the chip packaging structure of a fifth embodiment of the present invention.

Finally, referring to FIG. 9, a chip packaging structure 50 of a fifth embodiment of the present invention, including a chip module 52, a main body 54, a linear antenna 56, and an adhesive member 58, is illustrated. The structural relations of these components are roughly the same as mentioned in the previous embodiments, wherein the linear antenna 56 also has a first extending portion 562 and a second extending portion 564. A primary difference is that an end 562A of the first extending portion 562 and an end 564A of the second extending portion 564, which are away from the winding portion, are adjacent to each other. In other words, in the current embodiment, the linear antenna 56 is roughly a loop antenna without composing a complete ring. However, what is shown here is merely an example. In other embodiments, the end 562A and the end 564A could be substantially connected, making the linear antenna 56 form a complete ring.

In each of the abovementioned embodiments, the main body 14, 24, 34, 44, 54 is made of a thermoplastic flexible member. More specifically, the thermoplastic flexible member is selected from flexible plastics of Shore A or D hardness, and a melting point thereof is lower than the temperature required for the tire vulcanization process. By using such a material, the main body 14, 24, 34, 44, 54 of the chip packaging structure 10, 20, 30, 40, 50 of the present invention will melt during the tire vulcanization process. Therefore, if the chip packaging structure 10, 20, 30, 40, 50 of the present invention is applied inside a tire, the melted main body 14, 24, 34, 44, 54 would at least provide the following two advantages:

1. The main body 14, 24, 34, 44, 54 would be fused with the tire at least at edges thereof, and therefore once the tire is molded, the structure formed by the tire and the main body 14, 24, 34, 44, 54 could have a more homogeneous material, reducing the sharpness of the corners and edges of the main body 14, 24, 34, 44, 54; and 2. Some of the threads of the tire would be wrapped around the main body 14, 24, 34, 44, 54 which has been fused with the tire, and, since the main body 14, 24, 34, 44, 54 is fused with the tire at least at the edges thereof, these threads and the chip module 12, 22, 32, 42, 52 inside the chip packaging structure 10, 20, 30, 40, 50 of the present invention would have a better coupling effect.

According to the above descriptions, the chip packaging structures 10, 20, 30, 40, 50 of the present invention could provide better durability, and would be especially suitable for the interior of a tire and all kinds of applications in the automobile industry.

It should be realized that the above description is only some preferred embodiments of the present invention and should not be deemed as limitations of implementing the present invention. All substantially equivalent variations and modifications which employ the concepts disclosed in this specification and the appended claims should fall within the scope of the present invention.

What is claimed is:

1. A chip packaging structure, comprising:
  a chip module; and
  a main body comprising a first portion, a second portion, and a holding portion, wherein the second portion protrudes from the first portion, and a size of the second portion is smaller than a size of the first portion; the holding portion is located at the second portion, the holding portion of the main body is located at a side of the second portion away from the first portion, and the chip module is placed on the holding portion;

wherein the chip module is placed at the holding portion to be engaged with the main body;

wherein the chip packaging structure further comprises a linear antenna, the linear antenna comprises a first extending portion, a second extending portion, and a winding portion; the first extending portion is connected to the winding portion, the second extending portion is connected to the winding portion, and the winding portion winds around the chip module.

2. The chip packaging structure of claim 1, further comprising an adhesive member adapted to bond the winding portion of the linear antenna to the chip module, wherein the adhesive member covers at least a part of at least a side of the chip module.

3. The chip packaging structure of claim 1, wherein the main body further comprises a third portion, wherein the third portion is connected to the second portion, and is located at a side opposite to the first portion; a size of the third portion is greater than the size of the second portion; the holding portion of the main body is located in the second portion; each of the first portion and the third portion has a through hole communicating with the holding portion; the chip module is placed in the holding portion.

4. The chip packaging structure of claim 3, wherein the main body comprises a first shell and a second shell; the first shell and the second shell are correspondingly engaged to form the first portion, the second portion, the third portion, and the holding portion inside the holding portion.

5. The chip packaging structure of claim 3, further comprising a linear antenna, wherein the linear antenna comprises a first extending portion, a second extending portion, and a winding portion; the first extending portion is connected to the winding portion, the second extending portion is connected to the winding portion, and the winding portion winds around the second portion of the main body.

6. The chip packaging structure of claim 5, further comprising an adhesive member adapted to bond the winding portion of the linear antenna to the main body, wherein the adhesive member covers at least a part of a side of the main body.

7. The chip packaging structure of claim 6, wherein an end of the first extending portion and an end of the second extending portion which are away from the winding portion of the linear antenna are adjacent to each other.

8. The chip packaging structure of claim 5, wherein the winding portion of the linear antenna is substantially rectangular or round.

9. The chip packaging structure of claim 3, wherein an appearance of the first portion and an appearance of the third portion of the main body are rectangular or round.

10. The chip packaging structure of claim 3, wherein the through hole of the first portion, the holding portion located inside the second portion, and the through hole of the third portion all have a cross-sectional shape of a rectangle or a circle.

11. The chip packaging structure of claim 3, wherein the first portion, the second portion, and the third portion together form a slot adapted to accommodate the winding portion of the linear antenna; the slot has a cross-sectional shape of a semicircular arc, a rectangle, or a polygon.

12. The chip packaging structure of claim 1, wherein the main body is made of a thermoplastic flexible member, which melts during a vulcanization process, reducing a sharpness of corners and edges of the main body.

13. The chip packaging structure of claim 12, wherein the thermoplastic flexible member is selected from flexible plastics of Shore A or D hardness.

14. A chip packaging structure, comprising:
a chip module; and
a main body comprising a first portion, a second portion, and a holding portion, wherein the second portion protrudes from the first portion, and a size of the second portion is smaller than a size of the first portion; the holding portion is located at the second portion;
wherein the chip module is placed at the holding portion to be engaged with the main body;
wherein the main body further comprises a third portion, wherein the third portion is connected to the second portion, and is located at a side opposite to the first portion; a size of the third portion is greater than the size of the second portion; the holding portion of the main body is located in the second portion; each of the first portion and the third portion has a through hole communicating with the holding portion; the chip module is placed in the holding portion.

15. A chip packaging structure, comprising:
a chip module; and
a main body comprising a first portion, a second portion, and a holding portion, wherein the second portion protrudes from the first portion, and a size of the second portion is smaller than a size of the first portion; the holding portion is located at the second portion;
wherein the chip module is placed at the holding portion to be engaged with the main body;
wherein the main body is made of a thermoplastic flexible member, which melts during a vulcanization process, reducing a sharpness of corners and edges of the main body.

* * * * *